United States Patent [19]

Collins

[11] 4,234,850

[45] Nov. 18, 1980

[54] FIRING TIME CONTROL CIRCUIT

[75] Inventor: Thomas W. Collins, State College, Pa.

[73] Assignee: Optimizer Control Corporation, Burnsville, Minn.

[21] Appl. No.: 1,869

[22] Filed: Jan. 8, 1979

[51] Int. Cl.³ .......................... H03K 5/22; H03K 3/04
[52] U.S. Cl. ...................................... 328/66; 328/74; 307/232; 364/105
[58] Field of Search ...................... 328/66, 63, 56, 74; 364/105; 340/146.3 T; 330/1 A; 307/232, 269

[56] References Cited

U.S. PATENT DOCUMENTS

| 3,571,578 | 3/1971 | Fry | 364/105 |
| 3,588,385 | 6/1971 | Moye | 364/105 |
| 3,624,519 | 11/1971 | Beydler | 328/66 |

Primary Examiner—Stanley D. Miller, Jr.
Assistant Examiner—B. P. Davis
Attorney, Agent, or Firm—Orrin M. Haugen; Thomas J. Nikolai

[57] ABSTRACT

An adaptive control circuit for use with a machine performance optimizing system for producing a control delay between a first event and the time at which a response to that event is to take place. The adaptive control circuit of this invention, when used with an internal combustion point closure signal and will advance or retard the generation of a spark plug firing signal for a period determined by the optimizing system's operating parameters, while still maintaining the desired dwell dictated by the engine manufacturer.

7 Claims, 3 Drawing Figures

FIRING TIME CONTROL CIRCUIT

BACKGROUND OF THE INVENTION

I. Field of the Invention

This invention relates generally to an adaptive control circuit for use with a machine performance optimizing system, and more specifically to an event timing device, responsive to the direction signals provided by the optimizing system for generating an event signal at a desired point in time.

II. Description of the Prior Art

In a co-pending application, Ser. No. 845,804, filed Oct. 27, 1977 (now U.S. Pat. No. 4,130,863) and entitled *OPTIMIZING CONTROL SYSTEM* there is described a digital electronic control system for optimizing the performance of an energy consuming system wherein a given parameter is perturbated and the resulting effect on the machine or system performance is computed for producing a control signal which is used to adjust the parameter setting in a way tending to improve the output performance of the energy consuming system. This optimizing control system samples the effect on the performance of the machine with which it is used of a small, incremental change in the setting of a control parameter and the information obtained from the sampling process is used to adjust the setting in a way which tends to optimize the system performance.

When applied to an internal combustion engine environment such as that used in an automobile, incremental changes may be made in the distributor setting. The optimizing unit of the aforementioned Schweitzer et al patent employs a counting process to determine whether the incremental change or dithering of the control parameter results in an increase or a decrease in engine RPM. If during the dithering the machine appears to have gained speed during the "advance" portion of the dither cycle, then the optimizer unit responds by producing a control signal directing an additional advance in the parameter setting. However, if the counting process indicates that the machine suffered a speed decrease due to the incremental adjustment in the advance direction, then the optimizer unit responds by producing a control signal indicating that the setting should be retarded in order to improve performance.

A further understanding of the operation and construction of an optimizing control system with which the present invention finds utility may be obtained by a reading of the aforementioned Schweitzer et al application and the patents referred to therein.

The present invention is a digital circuit which accepts the "advance" and "retard" outputs from the optimizing control system and produces a control signal at the appropriate point of time in the engine's operation so that the improved performance of the engine can be attained. When applied in the environment of an internal combustion engine, the circuit of the present invention may receive pulse signals from the breaker points of the distributor and produce a firing pulse to the spark plugs at a precise time as determined by the optimizing control system.

SUMMARY OF THE INVENTION

The adaptive control circuit of the present invention, while not necessarily limited to use in cooperation with an optimizing control system for an automobile's internal combustion engine, will be described in that environment. Hence, the circuit of the present invention can be considered as a firing time control circuit.

At the heart of the circuit is a serial shift register which functions as a timing delay line and which receives at its input pulses obtained from the distributor's breaker points. These pulses are propagated down the shift register by pulses termed "celsig" pulses which are obtained from a magnetic pick-up associated with the engine's alternator and therefore related to the engine's RPM. Selected stages of the shift register delay line have their outputs coupled to a multiplexer unit which, in turn, is controlled by digital logic circuits which respond to the "advance" and "retard" control signals obtained from the optimizing control system, all as explained in the aforereferenced patent application Ser. No. 845,804, filed Oct. 27, 1977 (now U.S. Pat. No. 4,130,863). Hence, the multiplexer is effective to select a particular one of the shift register output stages for transmitting its output to the engine's firing circuit.

The firing time control circuit of the present invention includes a limit control circuit for ensuring that the firing impulse is not either advanced or retarded beyond prescribed limits wherein misfiring of the engine might occur. As a result, the firing time control circuit serves to alter the engine's firing time to satisfy the orders issued by the engine optimizing control system such that improved performance is achieved. This is accomplished without significantly altering the dwell period of the point signals from that dictated by the engine's manufacturer.

OBJECTS

It is accordingly the principal object of the present invention to provide a new and improved adaptive control circuit for use with a machine performance optimizing system.

Another object of the invention is to provide an adaptive control circuit of the type described which is implemented entirely with digital logic.

Still another object of the invention is to provide a new and improved firing time control circuit for use with an internal combustion engine optimizing control system.

A further object of the invention is to provide a digital firing time control circuit which adaptively re-creates the precise dwell time of the enginer's distributor but which delays the occurrence of the firing impulse so that it is either advanced or retarded with respect to the top dead center position, the amount of advance or retard being determined by the optimizing control system with which the firing time control circuit of the present invention is utilized.

These and other objects and advantages of the invention will become apparent to those skilled in the art from the following detailed description of a preferred embodiment when considered in conjunction with the accompanying drawings in which like parts in the several views are identified by the same reference numeral.

DESCRIPTION OF THE PREFERRED EMBODIMENT

Figure 1:
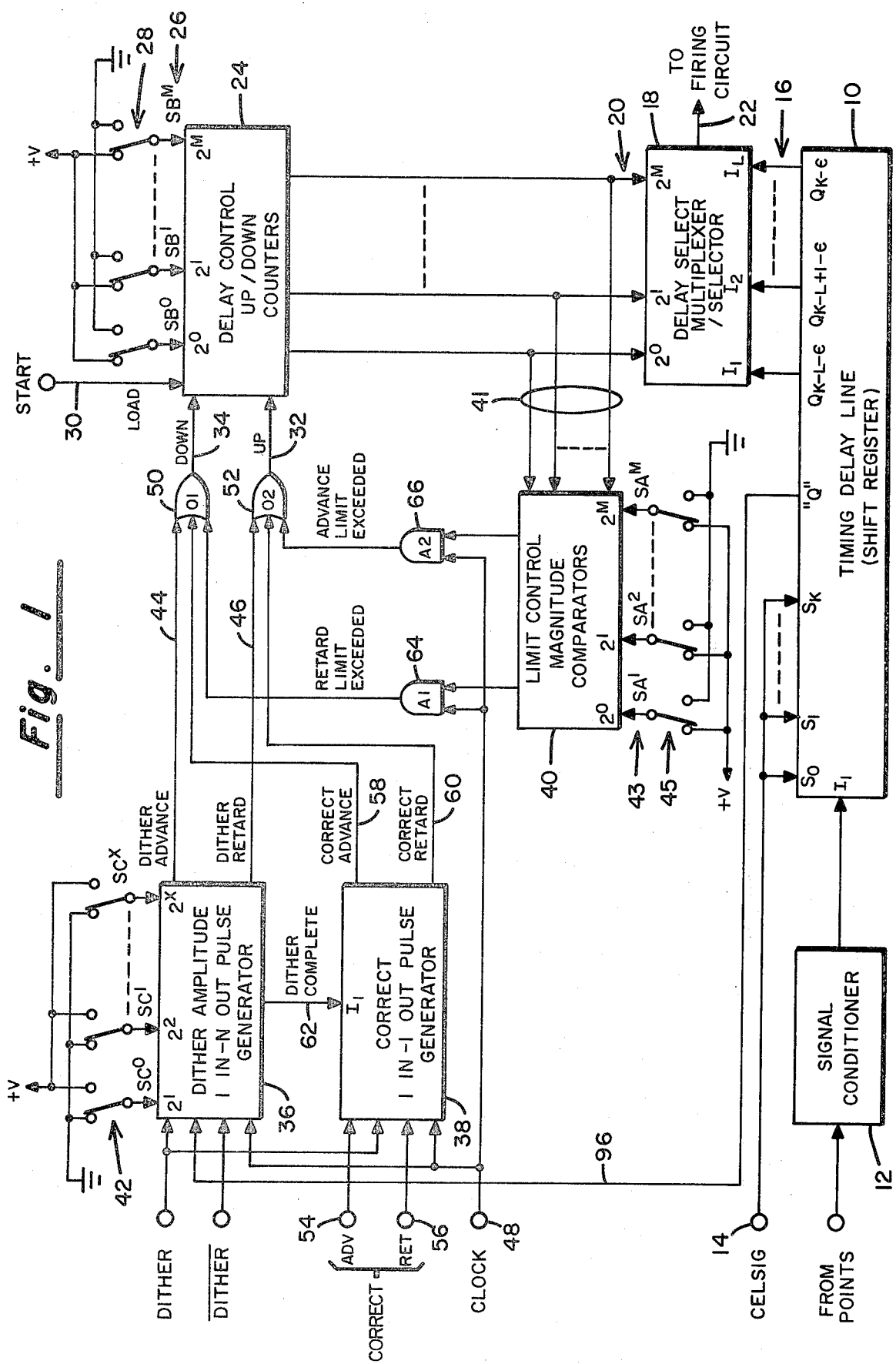
FIG. 1 is a block diagram of the adaptive control circuit comprising the preferred embodiment of the invention.

Referring to FIG. 1, there is shown a multistage serial shift register 10 having its input terminal I₁ adapted to receive impulses from the machine whose operating parameters are being monitored and controlled by an optimizing control system of the type described in the Schweitzer et al application Ser. No. 845,804, filed Oct. 27, 1977 now (U.S. Pat. No. 4,130,863). In the environment of an internal combustion engine, the event in question may be the impulses resulting from the making and breaking of the points. These impulses are applied to the shift register by way of a signal conditioning circuit 12 which functions to make the applied signal from the points compatible with the type of logic circuitry used in implementing the shift register 10. For example, if the shift register 10 is a standard TTL logic device, the signal conditioner 12 is effective to convert from a 12 volt signal obtained from the battery or alternator to approximately a 5 volt signal which is the amplitude compatible with TTL logic. It is to be understood, however, that if CMOS logic is used in implementing the serial shift register 10, then the signal conditioner 12 may not be necessary in that CMOS logic can operate directly from ground and 12 volt signal levels.

The shift register 10 also receives by way of the line 14 clocking impulses from the Celsig pulse generator. As is explained in the aforereferenced Schweitzer et al application, the celsig pulses are attained in a manner whereby the rate at which they occur is directly proportional to the rotational speed of the engine's crank shaft. Thus, the point closure signals are propagated down the delay line 10 at a rate proportional to engine speed.

A predetermined number of higher order stages of the shift register 10 have output lines, indicated generally by numeral 16, coupled to the input of a multiplexer/selector chip 18. Depending upon the permutations of the digital code applied by way of the input lines 20 to the multiplexer/selector 18, a given one of the plural input lines 16 from the shift register 10 will be selected and the signal on that one line will be transmitted via output line 22 to the firing circuit associated with the engine's spark plugs. Thus, whether such an output pulse will be produced early or late with respect to a given reference will be determined by the pattern of the digital code applied to the input terminals 20 of the chip 18.

The input code pattern is obtained at the output of an M-bit up/down counter chip 24. As is illustrated, the chip 24 has a plurality of input terminals, indicated generally by numeral 26 which are adapted to be connected to a source of positive potential (+V) or ground (0 volts) by way of single pole, double throw switches 28. The switches 28 are set so that an input code corresponding to the factory setting recommended for the engine starting condition can be selected. Hence, when the ignition key is turned to operate the engine's starter, a signal will be applied by way of a line 30 to the LOAD input of the counter chip 24. This LOAD signal enables gates (not shown) within the counter chip 24 so that the code pattern established by the switch settings will be preloaded into the counter 24. This code will operate through the multiplexer selector 18 to route pulses propagating down the shift register 10 out at a prescribed point on this delay line corresponding to the recommended factory setting. Once the car is started, the signal on line 30 reverts such that the input gates of the counter 24 are disabled and the code inputs on line 26 are of no significance. At this point, the contents of the counter 24 are determined by the pulses applied thereto by way of the "Up" and "Down" input lines 32 and 34 respectively. These signals are, in turn, determined by the operation of the Dither Amplitude circuit 36, the Correct circuit 38 and the Limit Control circuit 40, all of which will be described with more particularity hereinbelow.

The Dither Amplitude circuit 36 functions to define the amplitude of the change in timing to be obtained and in its simplest form comprises a One-In-N-Out pulse generator, the specific implementation of which will be described in detail hereinbelow. Each time the output of the dither flip-flop in the optimizing control system, i.e., flip-flop 30 shown in FIG. 1 of application Ser. No. 845,804, changes state, the Dither Amplitude circuit 36 of this invention outputs a predetermined number of pulses determined by the setting of the single-pole, double-throw switches indicated generally by numeral 42. These pulses will appear on either the Dither Advance line 44 or the Dither Retard line 46, depending upon whether the aforementioned dither flip-flop is in its set state or its reset state. The rate at which these pulse trains emanate on lines 44 or 46 is determined by the rate at which system clock signals are applied to the clock input terminal 48.

The Dither Advance pulses are applied as a first input to an OR circuit 50 whose output is connected by way of the line 34 to the down terminal of the M-bit up/down counter 24. In a similar fashion, the pulses appearing on the Dither Retard line 46 pass through an OR gate 52 and by way of line 32 to the up terminal of the counter 24.

A second input to each of the OR gates 50 and 52 comes from the Correct circuit 38. In the preferred embodiment, this circuit may comprise a One-In, One-Out pulse generator, the detailed implementation of which will be set forth later on in this specification. The circuit 38 receives as its principal inputs the Advance control signal and the Retard control signal emanating from the optimizing control system of the aforementioned Schweitzer et al application. More specifically, the signals appearing on lines 116 or 202 of the optimizing control system would be applied to the terminal 54 of FIG. 1 whereas the signals appearing on lines 114 or 204 of the optimizing control system would be applied to the input terminal 56 of the Correct circuit 38. In addition, clock pulses applied at input terminal 48 are also utilized by the Correct circuit 38. The circuit 38 responds to either an Advance or a Retard command from the optimizing control system and issues a pulse on either the "Correct Advance" output line 58 or the "Correct Retard" output line 60, which lines are respectively connected as second inputs to the OR gates 50 and 52. The Correct circuit 38 is arranged so that it may perform its function only upon completion of a dither sequence by the Dither Amplitude circuit 36. In this regard, the Correct circuit 38 receives a "Dither Complete" signal by way of line 62 which inhibits the operation of the Correct circuit during an interval wherein the Dither Amplitude circuit 36 is producing its output pulse trains. This arrangement ensures that pulses emanating from the Correct circuit 38 will not overlap or coincide with those produced by the Dither Amplitude circuit 36, thereby causing the Delay Control counter 24 to miss a count. A third input to the OR gates 50 and 52 comes by way of AND gates 64 and 66 from the Limit Control circuit 40.

The Limit Control circuit 40 may comprise a digital comparator network having a first set of input terminals 41 connected to receive the digital output signals from the Delay Control circuit (up/down counter) 24 and a second set of input terminals 43 adapted to be connected through single pole, double throw switches 45 to either a source of positive potential +V or to ground. As is apparent, by proper selection of the individual switches 45, one can enter a desired binary code pattern to which the contents of the Delay Control circuit 24 may be compared.

The binary number entered into the Comparator 40 by way of the switches 45 establish an upper and a lower limit which is determined experimentally for the particular engine with which the optimizing control system and the firing time control circuit of this invention are utilized.

Such a Limit Control circuit is necessary in that if the firing pulse should be developed too early in the cycle, misfiring is likely to occur. Similarly, if the firing pulse is retarded to far, it is possible that firing may occur in the wrong cylinder. In either event, the result is faulty engine operation and failure to comply with existing exhaust emission standards.

A second input to the AND gates 64 and 66 comes from a source of clock pulses (not shown) which is connected to the clock terminal 48. Hence, when the output from the Delay Control 24 becomes equal to the upper limit established by the switch 45 inputs to the comparator 40, the gate 66 will be enabled and a clock pulse will pass therethrough and through the OR circuit 52 to increment the count in the counter 24. However, should the value within the counter 24 become equal to the lower limit established by the switch 45 inputs to the comparator 40, gate 64 will be enabled and a clock pulse will pass therethrough and through the OR circuit 50 to decrement the contents of the Delay Control Counter 24.

Figure 2:
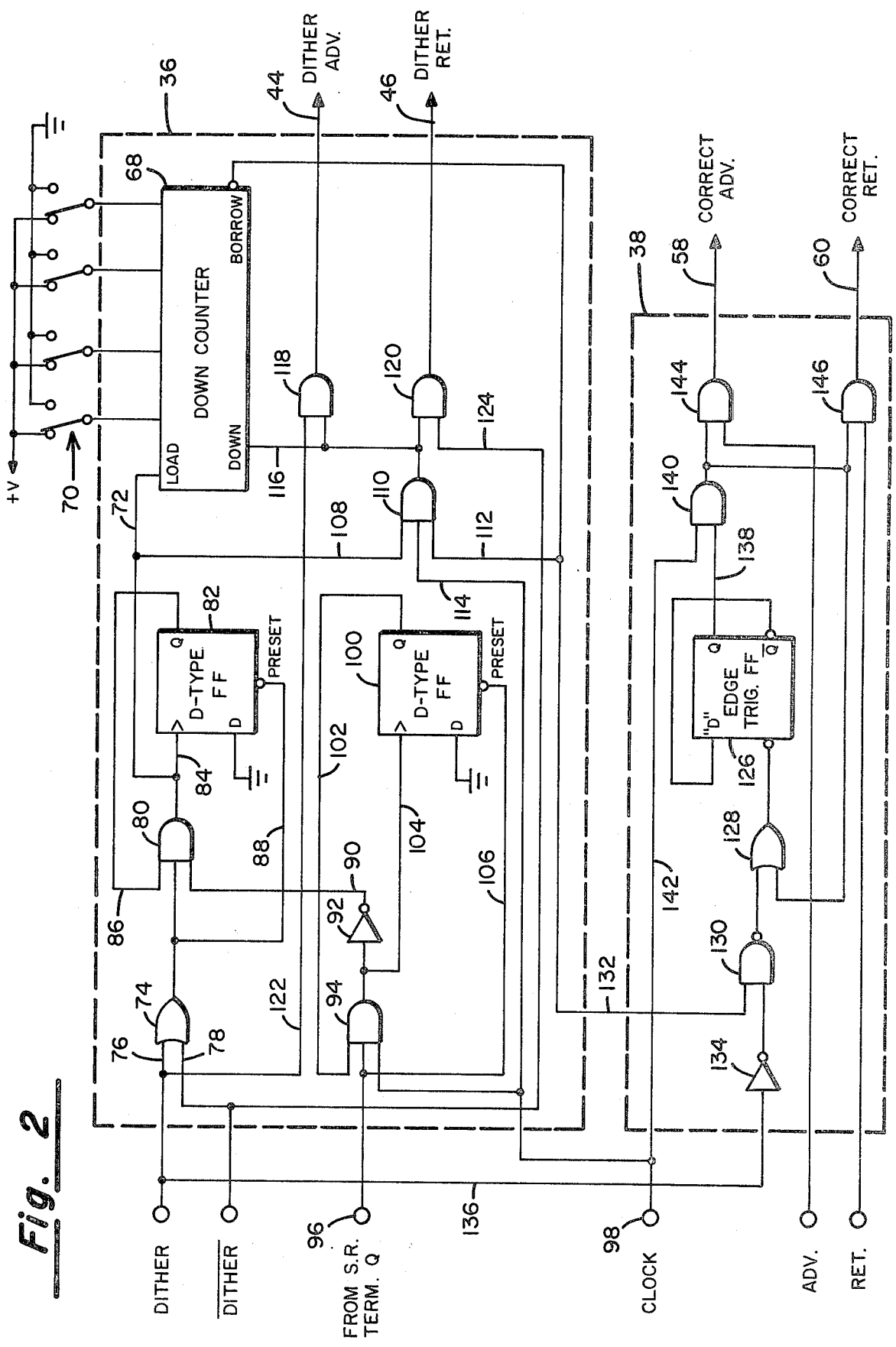
FIG. 2 is a detailed logic diagram illustrating the construction of the 1-in-N-out pulse generator and the 1-in-1-out pulse generator depicted in the block diagram of FIG. 1.

Referring now to FIG. 2, the details of the implementation of the Dither Amplitude circuit 36 of FIG. 1 will be explained. As was mentioned, the Dither Amplitude circuit 36 comprises a One-in, N-out pulse generator including a down counter 68 which is periodically preset to a preset count by a set of manually operable switches 70. That is, by properly setting the single pole-double throw switches, a binary pattern may be entered into the down counter 68 at the time that a Load Enable signal appears on the conductor 72. The number entered into the down counter determines the value, N, of the One-in, N-out pulse generator.

The logic circuitry controlling the operation of the down counter 68 includes a plurality of digital logic circuits. Specifically, an OR circuit 74 has first and second inputs applied from the digital optimizing control system by way of conductors 76 and 78. That is, the DITHER signal from the optimizing control system is applied to the OR circuit 74 by way of conductor 76 and the complement of that signal, i.e., the $\overline{\text{DITHER}}$ signal is applied to the OR circuit 74 by way of conductor 78. The output from OR gate 74 is applied to a three-input AND circuit 80 whose output is connected to the toggle input of a D-Type flip-flop 82 by way of conductor 84. The Q output from the flip-flop 82 is connected by way of a conductor 86 to a second input of the AND gate 80. A conductor 88 couples the output from the OR circuit 74 to the "PRESET" input terminal of the D-Type flip-flop 82. A third input to AND gate 80 is applied by way of conductor 90 from the output of an inverter 92 whose input is connected to the output of another three-input AND gate 94.

AND gate 94 receives as a first input on conductor 96 the output from the "Q" output terminal of the shift register 10 in FIG. 1. A second input to the AND gate 94 comes from a clock source (not shown) by way of the conductor 98. The third input to the AND gate 94 comes from the Q output of a second D-type flip-flop 100 by way of the conductor 102. The D-Type flip-flop 100 is adapted to be triggered by a signal emanating from the AND gate 94 by way of conductor 104. The PRESET terminal of the flip-flop 100 is connected by a conductor 106 to the conductor 96 and is therefore preset by the pulse appearing at the "Q" terminal of the shift register 10 of FIG. 1.

The output from the AND gate 80 is also applied by way of a conductor 108 to a first input of a three-input AND gate 110. A second input to this last-mentioned gate comes by way of conductor 112 from the Borrow output terminal of the down counter 68. Signals from the clock source are also applied by way of conductors 98 and 114 to the AND gate 110 such that when this gate is enabled, the clock pulses pass therethrough to decrement the counter 68 by way of the conductor 116.

The output from the gate 110 is also applied as a first input to a pair of AND gates 118 and 120. The second input for the AND gate 118 comes from the DITHER input terminal by way of conductor 122 and in a like fashion, the second input to the AND gate 120 comes from the $\overline{\text{DITHER}}$ input terminal by way of a conductor 124. The output signals from the One-in, N-out pulse generator emanates from these gates 118 and 120 and are applied to the three-input OR circuits 50 and 52 of FIG. 1 by way of conductors 44 and 46.

Also shown in FIG. 2 is the detailed logic configuration for the One-in, One-out pulse generator 38 of FIG. 1. Specifically, this logic includes an edge triggered flip-flop 126 and its associated input and output logic circuitry. The input to the flip-flop 126 comes from the output of a two-input OR circuit 128. A first input to this OR circuit comes from the output of NAND gate 130 also having two inputs. The first input to NAND gate 130 comes by way of a conductor 132 from the Borrow output of the down counter 68. The second input to gate 130 comes from an inverter circuit 134 whose input is connected to the DITHER input line 176 by way of a conductor 136.

The Q output from the edge triggered flip-flop 126 is coupled by way of a conductor 138 to a first input of an AND gate 140 whose second input comes from the clock source (not shown) by way of conductors 98, 114 and 142. The output from AND gate 140 is, in turn, connected as a first input to AND gates 144 and 146. The second input to AND gate 144 comes from the optimizing control circuit and specifically from terminal 116 of the aforereferenced Schweiter et al application. Similarly, the second input to the AND gate 146 is the RETARD control signal appearing at terminal 114 of the optimizing control circuit described in the aforereferenced Schweitzer et al application. The signals appearing at the output terminals of the AND gates 144 and 146 are the so-called "CORRECT ADVANCE"

and "CORRECT RETARD" signals appearing on conductors 58 and 60, respectively, in FIG. 1.

Now that the details of the description of the interconnections of the various circuits comprising the One-in, N-out pulse generator and the One-in, One-out pulse generator has been described, consideration will now be given to its mode of operation.

The occurrence of either a "DITHER" or a "DITHER" signal at the output of the optimizing control system passes through the OR gate 74 and by way of conductor 88 to set the flip-flop 82. The setting of this flip-flop partially enables the AND gate 80 by way of the output signal on conductor 86. The next leading edge of the firing pulse propagating down the shift register delay line 10 (FIG. 1) is extracted early in the cycle at the terminal "Q" and is conveyed by way of conductors 96 and 106 to set the flip-flop 100. With this flip-flop set, a high signal is applied by way of conductor 102 to partially enable the AND gate 94. The next clock pulse appearing on conductor 98 passes through the AND gate 94 to again clear the flip-flop 100 by way of conductor 104 and also passes through the inverter 92 and AND gate 80 to clear the flip-flop 82 and to stimulate the "LOAD" terminal of the down counter 68. The arrangement of the gates 80 and 94 and the flip-flops 82 and 100 ensure that the DITHER does not occur close to the leading edge of the firing pulse. It it were otherwise, the effect could be a multiple firing pulse leading to improper combustion and misfire.

As mentioned, at a time subsequent to the initiation of the DITHER signal on conductor 76, the down counter 68 is enabled and a predetermined number established by the setting of the single-pole, double-throw switches 70 is entered into the down counter. This predetermined number is the number, N, of the one-in, N-out pulse generator. The loading of the number N, into the counter 68 forces the Borrow output of the counter to a high state, thereby opening the AND gate 110 and allowing N-clock pulses applied by way of conductors 98 and 114 to pass through the gate 110 to the decrement (down) terminal of the counter 68 by way of conductor 116. After N pulses have been received by the counter, the Borrow output line 112 goes low, thereby disabling gate 110.

While the gate 110 is still enabled, the clock pulses passing therethrough are also applied to the AND gates 118 and 120. If the optimizing control system is producing a DITHER output, it will be gate 118 that is enabled so as to cause the clock pulses to appear on the Dither Advance line 44. However, if the optimizing control system is in its DITHER state, it will be gate 120 that is enabled so that the clock pulses appear on line 46, the Dither Retard line.

The One-in, One-out pulse generator 38 (FIG. 1) is also shown in detail in the logic diagram of FIG. 2. Its operation is as follows. At the time that the Borrow output signal from the down counter 68 switches from a high level to a low level, i.e., when the N-pulses have been received, NAND gate 130 will pass a signal through OR circuit 128 to trigger the edge triggered flip-flop 126 to its set state. When in this state, its "Q" output is high, thereby enabling AND gate 140 and allowing a clock pulse (applied by way of conductors 98, 114 and 142) to pass through this gate. The trailing edge of the first clock pulse coming through AND gate 140 passes through OR circuit 128 to again trigger the flip-flop 126. This resets the flip-flop and the "Q" output therefrom again goes low and permits no further pulses to pass through the gate 140.

Thus it can be seen that only a single pulse is gated through either AND gate 144 or AND gate 146, depending upon whether the Advance or the Retard signals from the optimizing control system is high at the time. A pulse emanating on conductor 58 will be applied through OR circuit 50 (FIG. 1) to decrement the Delay Control counter 24. A pulse emanating on line 60, however, passes through the OR gate 52 of FIG. 1 to increment that counter. Of course, if neither an Advance or Retard correction is called for by the optimizing control system with which the firing control circuit of the present invention is used, then neither gate 144 nor gate 146 is enabled and no correction pulses appear on either lines 58 or 60.

OVERALL OPERATION

Figure 3:
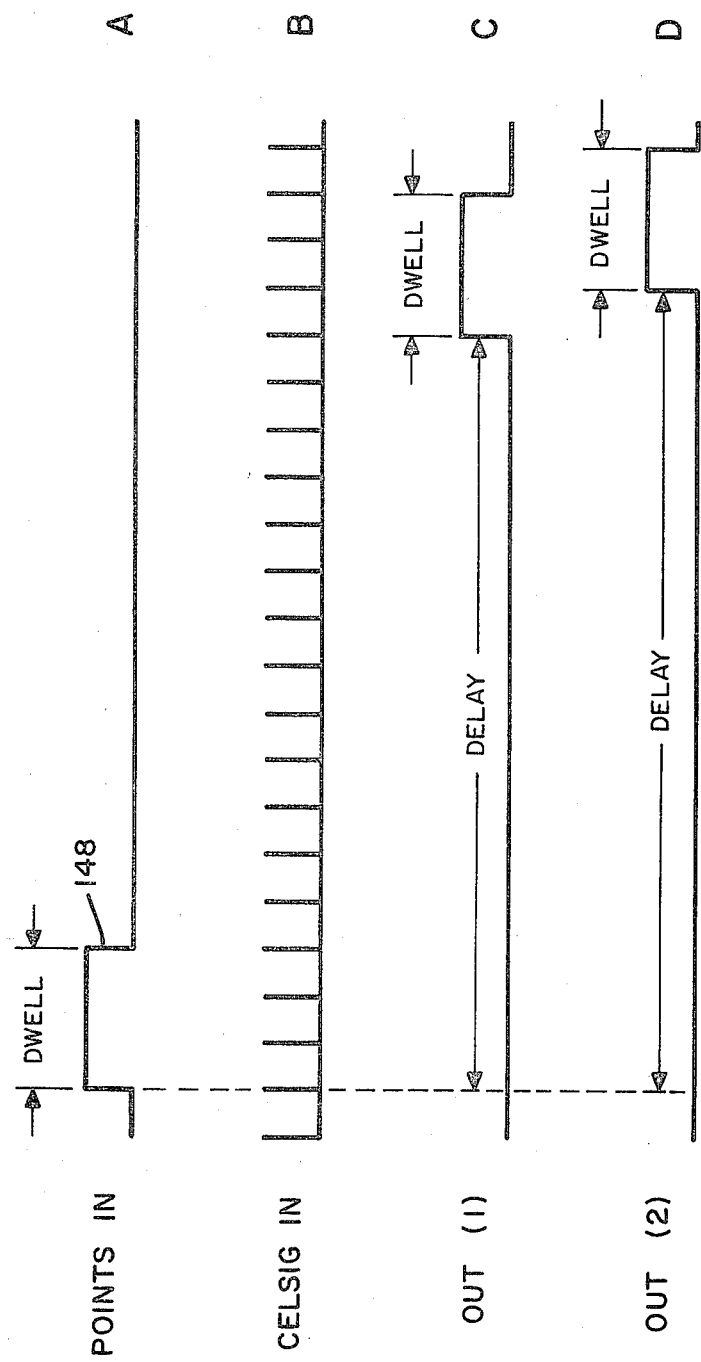
FIG. 3 is a timing diagram helpful in understanding the operation of the preferred embodiment.

With the aid of the timing diagram of FIG. 3, consideration will next be given to the overall operation of the system depicted in FIG. 1. Waveform A in FIG. 3 represents a typical point closure signal which may be obtained from the breaker points of an internal combustion engine or, alternatively, from an inductive pickup utilized in so-called electronic ignition systems. The width of the pulse 148 represents the dwell time of the points. This is the signal that would be applied to the input of the signal conditioner 12 and from there into the lowest order stage of the timing delay line shift register 10. Waveform B in FIG. 3 represents the so-called celsig pulses which, as described in the aforereferenced Schweitzer et al application, are pulses of a relatively high frequency proportional in rate to the RPM of the engine in question. These celsig pulses may be obtained from a magnetic pickup associated with a notched wheel on the alternator of the engine and are applied by way of line 14 to the shift register 10 to step the input signal down the shift register at the rate of occurrence of these celsig pulses. Thus, the pulse 148 will propagate down the shift register 10 until it reaches the selected parallel output line 16.

The particular line which is selected is determined by the multiplexer/selector circuit 18 which is controlled by the Delay Control up/down counter 24. As is apparent, the particular line selected (and therefore the time of generation of the firing pulse) may be advanced or delayed by either decrementing or incrementing the value contained in the counter 24.

The Limit Control magnitude comparators 40 continually monitor the value contained in the counter 24 and compare this value to upper and lower limits established by the setting of the single-pole, double-throw switches 45 which operate through the AND gates 64 and 66 and the OR gates 50 and 52 to maintain the value in counter 24 within the desired prescribed limits. For example, if the Advance limit is exceeded, gate 66 will be enabled and clock pulses at a megacycle rate will pass through the gate 66 to increment the counter 24, thus bringing it back within the prescribed limits very quickly. Gates 64 and 50 operate in the same fashion under control of the comparator 40 to present clock pulses to the decrement terminal of the counter 24 when the contents of the counter exceed the retard limit.

Waveform C in FIG. 3 illustrates the manner in which the firing pulse is delayed by the shift register 10 so as to occur at a time determined by the contents of the counter 24 operating through the multiplexer/selector 18. Waveform D in FIG. 3 illustrates the manner in which the firing signal appears after a single pulse has been received on the Correct Advance line 58. This signal (waveform D) shows more delay than that of waveform C. Thus, there is a controlled advance with the dwell time maintained to within plus or minus one celsig pulse. Hence, the firing time control circuit of the present invention may be controlled by the optimizing control system so that the firing pulse may be shifted in time in either the advance or retard direction while still maintaining the dwell time established by the engine manufacturer.

While the invention has been described in connection with the control of the firing time of an internal combustion engine, those skilled in the art can readily determine from the detailed description of the invention the manner in which the circuit of the present invention may be used to control the fuel injection cycle rather than the firing time. In an engine having fuel injection capability, it is, of course, important to effect the injection at a predetermined time in the engine cycle while maintaining the period of fuel flow within precise limits. The circuit of the present invention is operational to adaptively preserve that pulse width while permitting the pulse to be shifted earlier or later in the machine cycle under control of the engine optimizing system.

Thus it can be seen that there has been described a system which will operate to accomplish the objectives set forth herein. While there has been shown and described the preferred embodiment of the invention, those skilled in the art will possibly visualize modifications and changes to the basic arrangement disclosed. Hence, it is intended that the scope of the invention be determined from the following claims.

What is claimed is:

1. An adaptive control circuit for producing an output circuit signal at a time subsequent to an initial event as determined by an optimizing control system, comprising:
   (a) multi-stage delay line means having a plurality of output taps emanating from predetermined stages thereof and having an input terminal for receiving a pulse indicative of said initial event;
   (b) means for propagating said pulse through said delay line at a desired rate;
   (c) code responsive means coupled to said plurality of output taps for selecting only one of said taps at a time and delivering the signal thereon to a utilization device;
   (d) bi-directional counting means having its output coupled to said code responsive means; and
   (e) means for incrementing or decrementing said counting means by a predetermined count value as determined by said optimizing control system.

2. Apparatus as in claim 1 and further including means for initially entering a predetermined count value into said bi-directional counting means.

3. Apparatus as in claim 1 wherein said limit control means comprises a comparator circuit having means for entering binary coded signals representative of upper and lower limits as a first value therein and means for entering the output from said bi-directional counting means as a second value therein and having first and second output lines, said first output line carrying an output pulse when said second value exceeds said first value, said second output line carrying an output pulse when said second value is less than said first value.

4. Apparatus as in claim 3 wherein said means for incrementing or decrementing said counting means includes gating means connected to said first and second input lines of said comparator and to a source of clock signals, the output from said gating means being coupled to said bi-directional counting means.

5. Apparatus as in claim 1 wherein said means for incrementing or decrementing said counting means includes:
   (a) programmable pulse generating means for producing a predetermined number of pulses each time said programmable pulse generator receives a stimulating pulse from said optimizing control system; and
   (b) means coupling the output of said programmable pulse generator to said bi-directional counting means to increment said counting means by said predetermined number when said stimulating pulse is of a first type and for decrementing said counting means by said predetermined number when said stimulating pulse is of a second type.

6. Apparatus as in claim 5 wherein said means for incrementing or decrementing said counting means further includes:
   (a) a pulse generator coupled to receive control signals from said optimizing control system for producing pulses on either of two output lines depending upon the type of control signal being provided by said optimizing control system;
   (b) means coupling one of said output lines to the "up" input terminal of said bi-directional counting means and the other of said output lines to the "down" input of said bi-directional counting means; and
   (c) means for inhibiting said pulse generator during the time interval that said programmable pulse generator is active.

7. An adaptive control circuit for producing an output control signal at a time subsequent to an initial event as determined by an optimizing control system, comprising:
   (a) multi-stage delay line means having a plurality of output taps emanating from predetermined stages thereof and having an input terminal for receiving a pulse indicative of said initial event;
   (b) means for propagating said pulse through said delay line at a desired rate;
   (c) code responsive means coupled to said plurality of output taps for selecting only one of said taps at a time and delivering the signal thereon to a utilization device;
   (d) bi-directional counting means having its output coupled to said code responsive means;
   (e) means for incrementing or decrementing said counting means by a predetermined count value as determined by said optimizing control system; and
   (f) a limit control means coupled to the output of said bi-directional counting means for preventing the count in said counting means from exceeding in either direction predetermined upper and lower limits.

* * * * *